Patented Dec. 22, 1931

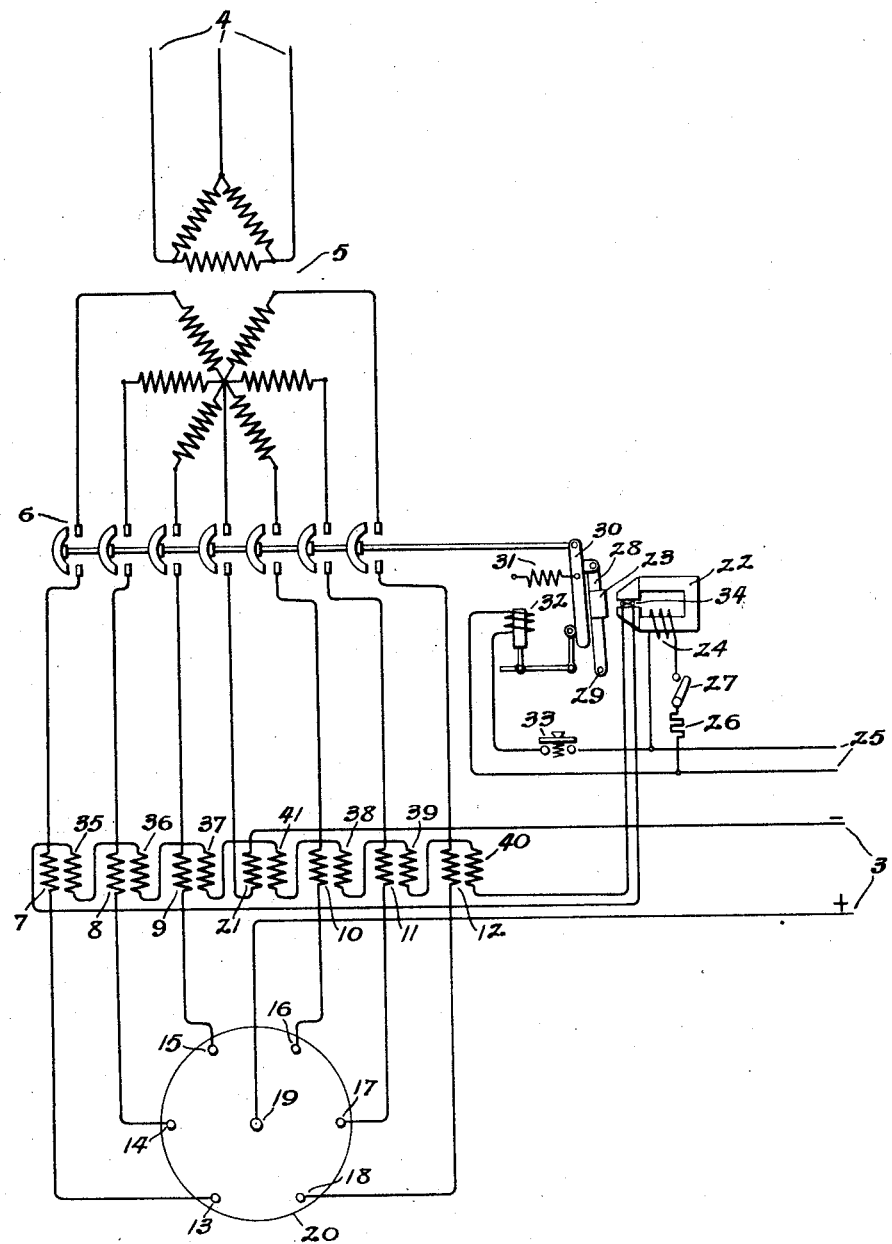

1,837,995

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

RECTIFYING SYSTEM

Application filed February 14, 1928. Serial No. 254,314.

My invention relates to rectifying systems wherein power is transmitted between direct and alternating current circuits through means including a transformer and a vapor electric device such as the mercury arc rectifier, and has for its principal object the provision of an improved apparatus and method of operation whereby the transformer windings and other parts of the apparatus are protected against the electrical disturbances caused by the arc-back of the rectifier.

In the past great difficulty has been encountered in the operation of mercury arc rectifiers due to the formation of destructive arcs between negatively and positively charged anodes or between other parts of the rectifier. This phenomenon is commonly known as arc-back. The reasons for arc-back have not been well understood, and no entirely satisfactory means have been heretofore provided for protecting the transformer windings and the apparatus to which these windings are connected against the electrical disturbances which these arcs occasion. In accordance with my invention, this difficulty is avoided by the provision of means operable to open the anode leads of the rectifier at substantially the same time that arc-back starts within the rectifier.

My invention will be better understood from the following description when considered in connection with the accompanying drawing, and its scope will be pointed out in the appended claims.

The drawing is a wiring diagram of a rectifying system wherein my invention has been embodied.

This system includes a direct current circuit 3 which is connected to a polyphase alternating current circuit 4 through a transformer 5, a high speed circuit breaker 6, primary coils 7 to 12 of a plurality of current transformers, cathode 19 and the anodes 13 to 18 of a vapor electric rectifier 20, and a current transformer coil 21 which is connected in series with the neutral lead of the six phase secondary winding of the transformer.

The control and operating apparatus of the high speed circuit breaker 6 includes a holding magnet 22 which is provided with armature 23 and with a holding coil 24 arranged to be energized through a suitable circuit 25, a resistor 26 and a switch 27. It will be observed that the armature 23 is mounted on a member 28 which is pivoted at 29 and is mechanically coupled to the operating rod of the switch 6 through a member 30. This member is biased to its illustrated position by a spring 31 and is arranged to move the armature 23 into engagement with holding magnet 22 in response to energization of a closing coil 32 shown as connected to the circuit 25 through a switch 33.

The holding magnet 22 is also provided with a coil 34 connected in series with a plurality of secondary coils 35 to 41 arranged to be energized by a current which is the resultant difference between the current induced in the coil 41 by the current of the neutral lead coil 21 and the sum of the currents induced in the coils 35 to 40 by the current of the anode lead coils 7 to 12.

When the currents of the anodes 13 to 18 are all transmitted to the cathode 19, the sum of the currents induced in the windings 35 to 40 is balanced against the current induced in the winding 41 and substantially no resultant current is supplied to the series coil 34. Under these conditions the switch 6 is maintained in its closed position by the flux produced through the holding coil 24. If the current in one of the anode lead coils 7 to 12 is reversed due to arc-back, however, a resultant current is supplied to the series coil 34, the magnetic flux of the holding magnet 22 is shifted from the armature 23 to the iron core of the series coil 34 in a well known manner, the switch 6 is opened by the spring 31, and the arc-back is immediately arrested. The various features of the circuit breaker 6 are more fully disclosed in a reissue Letters Patent of J. F. Tritle, No. 15,441, August 29, 1922. It is known that the speed of a circuit breaker of this type is such that it will interrupt the anode circuits in less than one cycle. Since the heat evolved in this time is very small, the rectifier is instantly available for further service. The invention thus has the advantages that the apparatus is protected from injury and may be put into service immediately after arc-back has occurred. It will of course be understood that any suitable means other than those illustrated may be utilized to produce a resultant current which is dependent on arc-back of the rectifier.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:

1. The combination of a transformer winding provided with end and neutral terminals, a vapor electric apparatus provided with anode and cathode terminals, means for interconnecting said end and anode terminals, and means responsive to the current transmitted between said end and anode terminals and to the current transmitted between said cathode and neutral terminals for controlling the operation of said interconnecting means.

2. The combination of a transformer winding provided with end and neutral terminals, a vapor electric apparatus provided with anode and cathode terminals, means for interconnecting said end and anode terminals, and means operable to control the operation of said interconnecting means in accordance with the resultant of the currents transmitted between said end and anode terminals and between said cathode and neutral terminals.

3. The combination of a transformer winding provided with end and neutral terminals, a vapor electric apparatus provided with anode and cathode terminals, means for interconnecting said end and anode terminals, and means operable to control the operation of said interconnecting means in accordance with the difference between the current transmitted between said end and anode terminals and that transmitted between said cathode and neutral terminals.

4. The combination of a transformer provided with end and neutral terminals, a vapor electric device provided with anode and cathode terminals, circuit control means arranged between said end and anode terminals and provided with a series coil, and means to impress upon said series coil a current equal to the difference between a current varying in accordance with the sum of the anode currents of said vapor electric device and a current varying in accordance with the cathode current of said device.

5. The combination of a transformer provided with end and neutral terminals, a vapor electric device provided with anode and cathode terminals, circuit control means arranged between said end and anode terminals and provided with a series coil, means for energizing said series coil in accordance with the resultant of the anode and cathode currents of said vapor electric device, and means arranged to maintain said circuit control means closed when the current of said series coil does not exceed a predetermined value.

6. The combination of a transformer winding provided with end and neutral terminals, a vapor electric apparatus provided with anode and cathode terminals connected respectively to the transformer terminals, means for controlling the operation of said apparatus, and means comprising transformers responsive respectively to the current transmitted between said end and anode terminals and to the current transmitted between said cathode and neutral terminals for controlling the operation of said first-named controlling means.

7. The combination of a transformer winding provided with end and neutral terminals, a vapor electric apparatus provided with anode and cathode terminals connected respectively to the transformer terminals, means for controlling the operation of said apparatus, and means comprising transformers responsive respectively to the current transmitted between said end and anode terminals and to the current transmitted between said cathode and neutral terminals operable to control the operation of said first-named controlling means in accordance with the resultant of said currents.

8. The combination of a transformer winding provided with end and neutral terminals, a vapor electric apparatus provided with anode and cathode terminals connected respectively to the transformer terminals, means for controlling the operation of said apparatus, and means comprising transformers responsive respectively to the current transmitted between said end and anode terminals and to the current transmitted between said cathode and neutral terminals operable to control the operation of said first-named controlling means in accordance with the difference between said currents.

In witness whereof, I have hereunto set my hand this 13th day of February, 1928.

DAVID C. PRINCE.